United States Patent
Ackermann et al.

(10) Patent No.: US 9,334,918 B2
(45) Date of Patent: May 10, 2016

(54) PISTON-CYLINDER UNIT

(71) Applicants: Stefan Ackermann, Bonn (DE); Arnold Schilz, Lahnstein (DE)

(72) Inventors: Stefan Ackermann, Bonn (DE); Arnold Schilz, Lahnstein (DE)

(73) Assignee: Stabilus GmbH, Koblenz (DE)

( * ) Notice: Subject to any disclaimer, the term of this patent is extended or adjusted under 35 U.S.C. 154(b) by 40 days.

(21) Appl. No.: 14/179,192

(22) Filed: Feb. 12, 2014

(65) Prior Publication Data
US 2014/0231198 A1    Aug. 21, 2014

(30) Foreign Application Priority Data

Feb. 15, 2013  (DE) .................... 20 2013 100 700 U

(51) Int. Cl.
*F16F 9/32*    (2006.01)
*F16F 9/38*    (2006.01)
*F15B 15/14*   (2006.01)
*F16F 9/19*    (2006.01)

(52) U.S. Cl.
CPC ............ *F16F 9/3242* (2013.01); *F15B 15/1461* (2013.01); *F16F 9/19* (2013.01); *F16F 9/38* (2013.01)

(58) Field of Classification Search
CPC .......... F16F 9/3242; F16F 9/19; F16F 9/3235
USPC .............................. 188/297, 322.19
See application file for complete search history.

(56) References Cited

U.S. PATENT DOCUMENTS

| | | | |
|---|---|---|---|
| 5,431,259 A * | 7/1995 | Mizutani et al. | 188/266.4 |
| 6,749,047 B2 * | 6/2004 | Koyano et al. | 188/321.11 |
| 7,445,096 B2 | 11/2008 | Mauer | |
| 2009/0007626 A1 | 1/2009 | Bochen et al. | |
| 2009/0107779 A1 * | 4/2009 | Azekatsu et al. | 188/267.2 |
| 2011/0198173 A1 * | 8/2011 | Kim | 188/322.13 |
| 2013/0161141 A1 * | 6/2013 | Maegawa et al. | 188/297 |

FOREIGN PATENT DOCUMENTS

| | | | |
|---|---|---|---|
| CN | 2738034 | | 11/2005 |
| CN | 202659798 | | 1/2013 |
| CN | 202708046 | | 1/2013 |
| EP | 1674759 | A1 * | 6/2006 |
| JP | 1981135543 | | 10/1981 |
| JP | 1983052347 | | 4/1983 |
| JP | 2006-170444 | | 6/2006 |
| JP | 2006170444 | A * | 6/2006 |
| JP | 2007-085377 | | 4/2007 |
| JP | 2007198512 | A * | 8/2007 |
| KR | 10 2008 0112109 | | 12/2008 |

* cited by examiner

*Primary Examiner* — Melanie Torres Williams

(74) *Attorney, Agent, or Firm* — Cozen O'Connor

(57) ABSTRACT

A piston-cylinder unit includes: a cylindrical pressure tube having a first end side defining an end side opening; a piston, axially displaceable in the pressure tube, the piston having a piston rod, the piston rod being guided out of the pressure tube at the first end side through the end side opening; a piston rod guide and a piston rod seal, arranged inside the pressure tube, which cooperate together to sealingly guide the piston rod at the end side opening; and a cup-like protective cap surrounding an end region of the cylindrical pressure tube from the first end side, the protective cap having a base at its end, the base having a coaxial through-orifice having an inner wall through which the piston rod extends in a displaceable manner. The inner wall of the through-orifice tightly surrounds the piston rod.

8 Claims, 2 Drawing Sheets

PISTON-CYLINDER UNIT

BACKGROUND OF THE INVENTION

1. Field of the Invention

The invention is directed to a piston-cylinder unit with a cylindrical pressure tube having a surface protection on the outer side of the pressure tube and with a piston axially displaceable in the pressure tube and having a piston rod. The piston rod is guided out of the pressure tube at one end side of the pressure tube through an end side opening through a piston rod guide and sealingly through a piston rod seal. An end region of the pressure tube proceeding from the end side on the piston rod side is excluded from the surface protection, and the end region excluded from the surface protection is coated with a corrosion inhibitor and is covered by a cup-like protective cap configured to surround the end region and having a base at its end on the piston rod side. The base has a coaxial through-orifice through which the piston rod extends in a displaceable manner.

2. Description of the Related Art

In a piston-cylinder unit of the type mentioned above, dirt particles can settle on the portion of the piston rod protruding from the pressure tube and become jammed in the gap between the piston rod and piston rod guide, resulting in damage to the piston rod and piston rod seal. The dirt particles can also adhere to the piston rod seal and directly impair it. In both cases, malfunctions of the piston-cylinder unit can result.

SUMMARY OF THE INVENTION

Therefore, it is an object of the invention to provide a piston-cylinder unit of the type mentioned above in which malfunctions of the piston-cylinder unit caused by dirt particles can be at least substantially prevented.

In accordance with one aspect of the invention, this object is met according to the invention in that the inner wall of the through-orifice tightly surrounds the piston rod.

As a result of this arrangement, moisture, dust and dirt particles adhering to the piston rod are stripped off and accordingly can no longer reach the piston rod guide or piston rod seal and damage them so that a malfunction of the piston-cylinder unit brought about in this way is prevented.

In another aspect, the surface protection is a powder coating or lacquering, e.g., a spray lacquering or dip lacquering. The surface protection can also comprise a shrink tubing.

In accordance with one aspect, the protective cap is made of a thermoplastic elastomer at least in the area of the through-orifice thereof, allowing it to cling well to the surface of the piston rod and carry out its stripping function. However, it is also possible for the protective cap to comprise a thermoplastic at least in the area of the through-orifice thereof.

In one aspect of the invention, the protective cap comprises, at least in the area of the through-orifice, a material that is flexible in a temperature range between approximately −40° C. and approximately +130° C.

A material of this type can be, for example, nitrile rubber (NBR), which is accordingly well suited for use in motor vehicles.

A good stripping function is achieved, in accordance with one aspect of the present invention, in that a radially circumferential elastic seal is arranged at the inner wall of the through-orifice.

In another aspect, the protective cap and seal are integrally formed, which facilitates production and assembly.

In another aspect, the elastic seal comprises one or more radially circumferential sealing lips, which preferably have a sealing edge surrounding the piston rod accompanied by pre-loading. In this way, the sealing edge acts as a scraper so that the stripping capability is further improved and even particles that adhere more stubbornly to the piston rod can be stripped off.

This improved sealing capability and stripping capability is achieved, in accordance with an aspect of the invention, particularly when the sealing edge has a V-shaped cross section, wherein the side of the sealing edge remote of the pressure tube is steeply inclined toward the free end of the piston rod and the side of the sealing edge facing the pressure tube is shallowly inclined away from the free end of the piston rod with respect to the longitudinal axis of the piston rod. However, it is also possible for the sides of the sealing edges to be inclined at approximately the same angle with respect to the longitudinal axis of the piston rod.

In order to tightly surround the piston rod, in another aspect, the circumferential elastic seal is arranged at a cuff-like projection of the protective cap, which projects away from the pressure tube coaxially proceeding from the base of the protective cap.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is shown in the drawings and is described more fully in the following. In the drawings.

DETAILED DESCRIPTION OF THE PRESENTLY PREFERRED EMBODIMENTS

Figure 1:
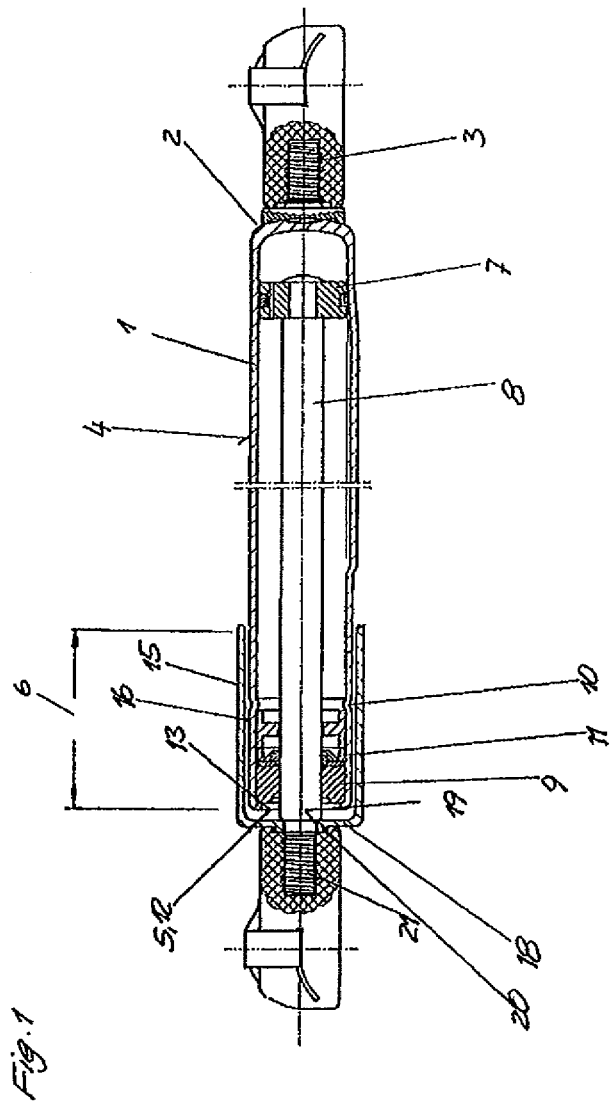
FIG. 1 illustrates a piston-cylinder unit in a longitudinal section view.

The piston-cylinder unit shown in FIG. 1 has a cylindrical pressure tube 1, which is closed at both ends thereof.

The pressure tube 1 has a threaded bolt 3 at the one closed end side 2. A first connection piece for the piston-cylinder unit is screwed to the threaded bolt 3.

To produce the piston-cylinder unit, the pressure tube 1 is first cleaned. Then a base coat, formed as corrosion inhibiting layer, is applied to the entire outwardly facing surface 4 of the pressure tube 1 and is hardened by drying.

The end region 6 of the pressure tube 1, proceeding from the other end side 5, is then covered. A surface protection having a powder coating is then applied to the pressure tube 1 in a powder coating process and is fired in a temperature step. The above-mentioned end region 6 is excluded from the powder coating application because of its covering and consequently has no powder coating. Accordingly, the outer surface of the pressure tube 1 is now formed by the base coat, in the end region 6 proceeding from the second end side 5, and by the powder coating in the rest of the pressure tube 1.

Subsequently, mounting parts, including a piston 7, a piston rod 8, a piston rod guide 9 and a piston rod seal 11, are inserted into the pressure tube 1, which remains open at the second end side 5. Further, a pressurized fluid, preferably gas, is introduced into the pressure tube 1 under pre-pressure. It is now possible to insert the mounting parts and introduce the pressurized fluid without risk because heat is no longer applied to the pressure tube 1 as was still carried out, for example, in the above-mentioned powder coating process. Accordingly, there is no risk of subsequent damage to the mounting parts or of an unwanted expansion of the pressurized fluid, which could lead to destruction of the pressure tube 1.

A circumferential bead 10, which faces radially inward, i.e., toward the center axis of the pressure tube, is now introduced in the end region 6, which was excluded from the powder coating process. The bead 10 supports the piston rod guide 9 and/or piston rod seal 11 arranged in the pressure tube 1 in axial direction.

Further, the pressure tube 1 is flanged on the radially inner side at the second end side 5. On the one hand, the end wall 12 formed in this manner closes the end of the pressure tube 1 and, in addition, supports the piston rod guide 9 and/or the piston rod seal 11. On the other hand, the edge of the flange facing the center axis of the pressure tube forms an end side opening 13 of the pressure tube 1 through which the piston rod 8 is guided out of the interior of the pressure tube 1.

Due to the fact that the end region 6, which was excluded from the powder coating process, has no powder coating, there is no risk, either when introducing the bead 10 or when flanging that the powder coating will peel off, particularly flake off, due to yielding of the pressure tube material.

The end region 6 of the pressure tube 1 is subsequently coated with a corrosion inhibitor 16, and a protective cap 15 is pushed onto the end region 6 of the pressure tube 1 from the piston rod side until it completely surrounds the end region 6.

The protective cap 15, which is made of a nitrile rubber (NBR), is formed in the shape of a cup having a base 18 at its end remote of the first end side 2 of the pressure tube 1 and comprises a coaxial through-orifice 19 in the base 18 through which the piston rod 8 is guided in a displaceable manner.

Figure 2:
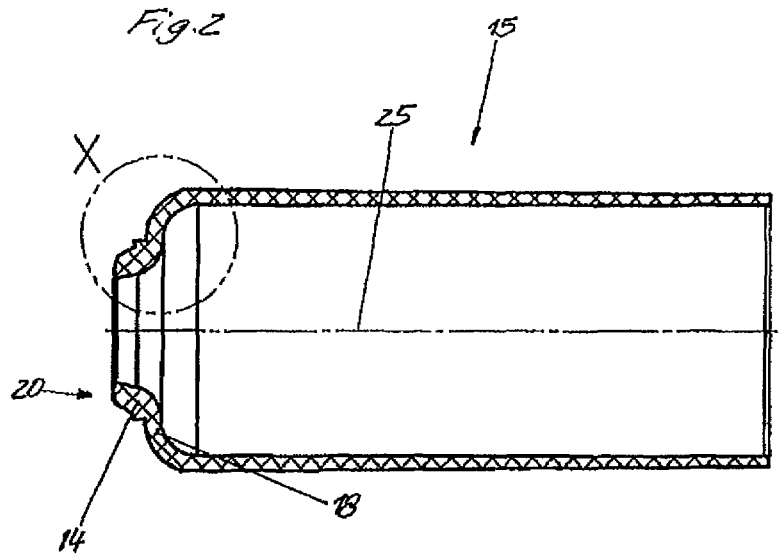
FIG. 2 is an enlarged view of the protective cap of the piston-cylinder unit according to FIG. 1 in a longitudinal section view.
Figure 3:
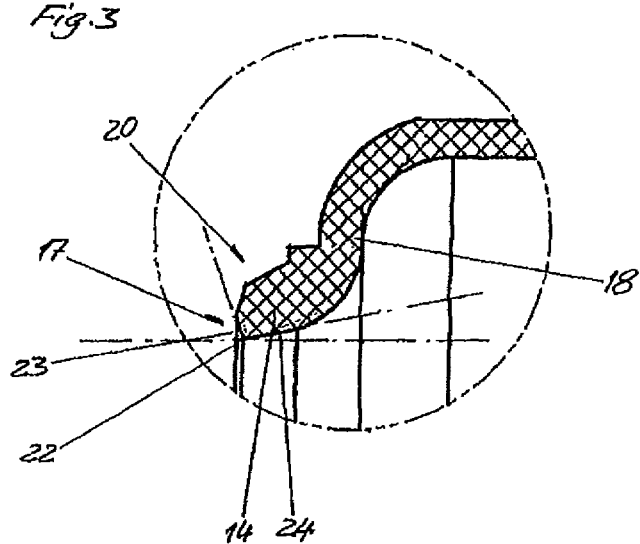
FIG. 3 is an enlarged view of the detail X from FIG. 2.

The through-orifice 19 also extends through a cuff-like projection 14, visible in FIGS. 2 and 3, of the protective cap 15 extending from the base 18 of the protective cap 15 coaxially away from the pressure tube 1. A radially circumferential seal 20, having a radially circumferential sealing lip 17 which surrounds the piston rod 8 under radial pre-loading with a V-shaped sealing edge 22 is formed at the end of the projection 14 remote of the pressure tube 15.

As can be seen in FIG. 3, the first side 23 of the sealing edge 22 remote of the pressure tube 1 is inclined toward the free end of the piston rod 8 at a steep angle of 60° with respect to the longitudinal axis 25 of the piston rod 8, while the second side 24 of the sealing edge 22 facing the pressure tube 1 is inclined toward the pressure tube 1 at a shallow angle of 20° with respect to the longitudinal axis 25 of the piston rod 8. As a result of this arrangement, even particles firmly adhering to the surface of the piston rod 8 are stripped off and therefore cannot reach the piston rod guide 9 and piston rod seal 11 and cause damage to the latter.

As can be seen in FIG. 1, the outer free end of the piston rod 8 is provided with a second threaded bolt 21. A second connection piece for the piston-cylinder unit is screwed to threaded bolt 21.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston-cylinder unit comprising:
  a cylindrical pressure tube (1) having a first end side (5) defining an end side opening (13), the cylindrical pressure tube (1) having a surface protection on at least a portion of its outer surface;
  a piston (7), axially displaceable in the pressure tube (1), the piston (7) having a piston rod (8), the piston rod (8) being guided out of the pressure tube (1) at the first end side (5) through the end side opening (13);
  a piston rod guide and a piston rod seal, arranged inside the pressure tube (1), which cooperate together to sealingly guide the piston rod at the end side opening (13); and
  a cup-like protective cap (15) surrounding an end region (6) of the cylindrical pressure tube (1) from the first end side (5), the protective cap (15) having a base (18) at its end, the base (18) having a coaxial through-orifice (19) having an inner wall through which the piston rod (8) extends in a displaceable manner,
  wherein:
  the inner wall of the through-orifice (19) tightly surrounds the piston rod (8),
  the outer surface of the cylindrical pressure tube (1) at the end region (6) is excluded from the surface protection, the outer surface of the cylindrical pressure tube (1) at end region (6) being coated with a corrosion inhibitor (16),and
  the protective cap (15) comprises a radially circumferential elastic seal (20) arranged at the inner wall of the through-orifice (19), the radially circumferential elastic seal (20) having a sealing edge (22) wherein a first side of the sealing edge (22), distal from the pressure tube (1), is steeply inclined toward a free end of the piston rod (8), with respect to a longitudinal axis (25) of the piston rod, and a second side of the sealing edge (22), facing the pressure tube (1), is shallowly inclined away from the free end of the piston rod (8), with respect to the longitudinal axis (25) of the piston rod (8).

2. The piston-cylinder unit according to claim 1, wherein the protective cap (15) comprises an elastomer at least in the area of the through-orifice (19).

3. The piston-cylinder unit according to claim 2, wherein the protective cap (15) comprises, at least in the area of the through-orifice (19), a material that is flexible in a temperature range between approximately −40° C. and approximately +130° C.

4. The piston-cylinder unit according to claim 1, wherein the protective cap (15) and the radially circumferential elastic seal (20) are integrally formed.

5. The piston-cylinder unit according to claim 1, wherein the radially circumferential elastic seal (20) comprises one or more radially circumferential sealing lips (17).

6. The piston-cylinder unit according to claim 5, wherein each sealing lip (17) has a sealing edge (22) surrounding the piston rod (8) accompanied by pre-loading.

7. The piston-cylinder unit according to claim 6, wherein the sealing edge (22) has a V-shaped cross section.

8. The piston-cylinder unit according to claim 1, wherein the protective cap (15) has a cuff-like projection (14) that projects away from the pressure tube (1) coaxially proceeding from the base (18) of the protective cap (15), the circumferential elastic seal (20) being arranged at the cuff-like projection (14) of the protective cap (15).

* * * * *